United States Patent

Kraft et al.

[11] Patent Number: 5,498,127
[45] Date of Patent: Mar. 12, 1996

[54] ACTIVE ACOUSTIC LINER

[75] Inventors: Robert E. Kraft, Cincinnati; Karen B. Kontos, Loveland, both of Ohio

[73] Assignee: General Electric Company, Cincinnati, Ohio

[21] Appl. No.: 340,091

[22] Filed: Nov. 14, 1994

[51] Int. Cl.$^6$ .................................................... F01D 25/04
[52] U.S. Cl. ........................... 415/119; 60/725; 181/206; 244/1 N; 381/71
[58] Field of Search .............................. 415/119; 60/725; 381/71; 181/206; 244/1 N; 310/322, 334, 336

[56] References Cited

U.S. PATENT DOCUMENTS

| | | |
|---|---|---|
| 4,421,811 | 12/1983 | Rose et al. |
| 4,715,559 | 12/1987 | Fuller . |
| 4,815,139 | 3/1989 | Eriksson et al. |
| 4,926,963 | 5/1990 | Snyder . |
| 4,967,550 | 11/1990 | Acton et al. ........................... 60/39.29 |
| 5,018,203 | 5/1991 | Sawyers et al. |
| 5,024,288 | 6/1991 | Shepherd et al. |
| 5,119,427 | 6/1992 | Hersh et al. ............................... 381/71 |
| 5,310,586 | 5/1994 | Mullen . |
| 5,315,661 | 5/1994 | Gossman et al. |
| 5,370,340 | 12/1994 | Pla ............................................. 244/1 N |
| 5,371,801 | 12/1994 | Powers et al. ............................. 381/71 |
| 5,415,522 | 5/1995 | Pla et al. .................................. 415/119 |

FOREIGN PATENT DOCUMENTS 0053587 3/1993 Japan ......................................... 381/71

OTHER PUBLICATIONS

Kim et al, "Optimal Design of Piezoactuators for Active Noise Vibration Control," AIAA Journal, vol. 29, No. 12, Dec. 1991, pp. 2047–2053.

Lee et al, "Piezoelectric Modal Sensors and Actuators Achieving Critical Active Damping on a Cantilever plate," AIAA–89–1390, Apr. 3–5, 1989, pp: Cover, 2018–2026.

Sirlin, "Piezoelectric Polymer–based Isolation Mount for Articulated Pointing Systems on Large Flexible Spacecraft," Paper AAS87-456, Aug. 10–13, 1987, pp: Cover, 1–24.

Motsinger et al, "Design and Performance of Duct Acoustic Treatment," NASA RP 1258, Aeroacoustics of Flight Vehicles, vol. 2, Noise Control, Aug. 1991, pp: 165–206.

Primary Examiner—Edward K. Look
Assistant Examiner—Christopher Verdier
Attorney, Agent, or Firm—Andrew C. Hess; Patrick R. Scanlon

[57] ABSTRACT

An active liner for attenuating noise includes a rigid backplate supporting a piezoelectric panel. A pressure transducer is disposed in the panel for sensing acoustic pressure of noise being propagated against a face surface of the panel. A controller includes a predetermined schedule of acoustic impedance for controlling a displacement driver joined to the panel to effect a displacement velocity of the panel face surface for obtaining a predetermined acoustic impedance at the sensed acoustic pressure for attenuating noise.

10 Claims, 2 Drawing Sheets

ACTIVE ACOUSTIC LINER

The present invention relates generally to acoustic treatment for suppressing radiated noise, and, more specifically, to an active acoustic liner for attenuating noise in an aircraft engine nacelle.

BACKGROUND OF THE INVENTION

A typical turbofan gas turbine engine for powering an aircraft in flight includes a nacelle having an inlet providing ambient air to a fan. The fan is powered by a conventional power turbine disposed downstream from a core engine thereof.

During takeoff of the aircraft, the rotational speed of the fan reaches relatively high values, with the tips thereof obtaining transonic or supersonic speeds which generate noise. A typical component of the noise occurs at relatively low frequencies below about 1,000 Hertz, with multiple pure tone (MPT) noise radiated from the engine inlet being particularly annoying to passengers in the aircraft and to people on the ground.

The MPT noise can be suppressed or attenuated using conventional passive acoustic liners. A typical passive acoustic liner includes a perforated facesheet which lines the nacelle duct, and one or more surrounding honeycomb structures, with a rigid backplate therearound. The acoustic liners must be configured or tuned to specific frequency ranges in order to effectively attenuate noise. A typical nacelle duct includes two types of acoustic liners: a forward, relatively thin liner for attenuating relatively high frequency noise greater than 1,000 Hz; and an aft liner adjoining the forward liner which is relatively thick for attenuating the low frequency MPTs below 1,000 Hz. These liners are specifically configured for effecting a suitable impedance at the wall or facesheets thereof for passively absorbing or attenuating specific frequency noise. Acoustic impedance is a conventional term representing the ratio of the local acoustic pressure to the normal component of acoustic velocity at the facesheet and accounts for phase as well as magnitude.

Conventional analytical procedures are available for predicting optimum acoustic impedance for maximizing noise attenuation at given frequencies. However, the low frequency MPTs require relatively thick acoustic liners which therefore add undesirable space requirements as well as increase overall engine weight. The MPT acoustic liners either add undesirable extra length to the nacelle or reduce the length available for the high frequency acoustic liners. And, since the thickness of the MPT acoustic liner is proportional to the wave length of a relatively narrow bandwidth of noise, differently configured MPT acoustic liners would be required for a given engine for attenuating wider bandwidth noise.

Active noise control systems are known for injecting acoustic energy with suitable power to cancel pressure waves being generated by the noise source. These systems are also referred to as anti-noise systems since they generate opposite phase noise for canceling the source noise. However, these systems are relatively complex and require microphones at the listening location, and loud speakers for generating the anti-noise, and vary in effectiveness.

SUMMARY OF THE INVENTION

An active liner for attenuating noise includes a rigid backplate supporting a piezoelectric panel. A pressure transducer is disposed in the panel for sensing acoustic pressure of noise being propagated against a face surface of the panel. A controller includes a predetermined schedule of acoustic impedance for controlling a displacement driver joined to the panel to effect a velocity of the panel face surface for obtaining a predetermined acoustic impedance at the sensed acoustic pressure for attenuating noise.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
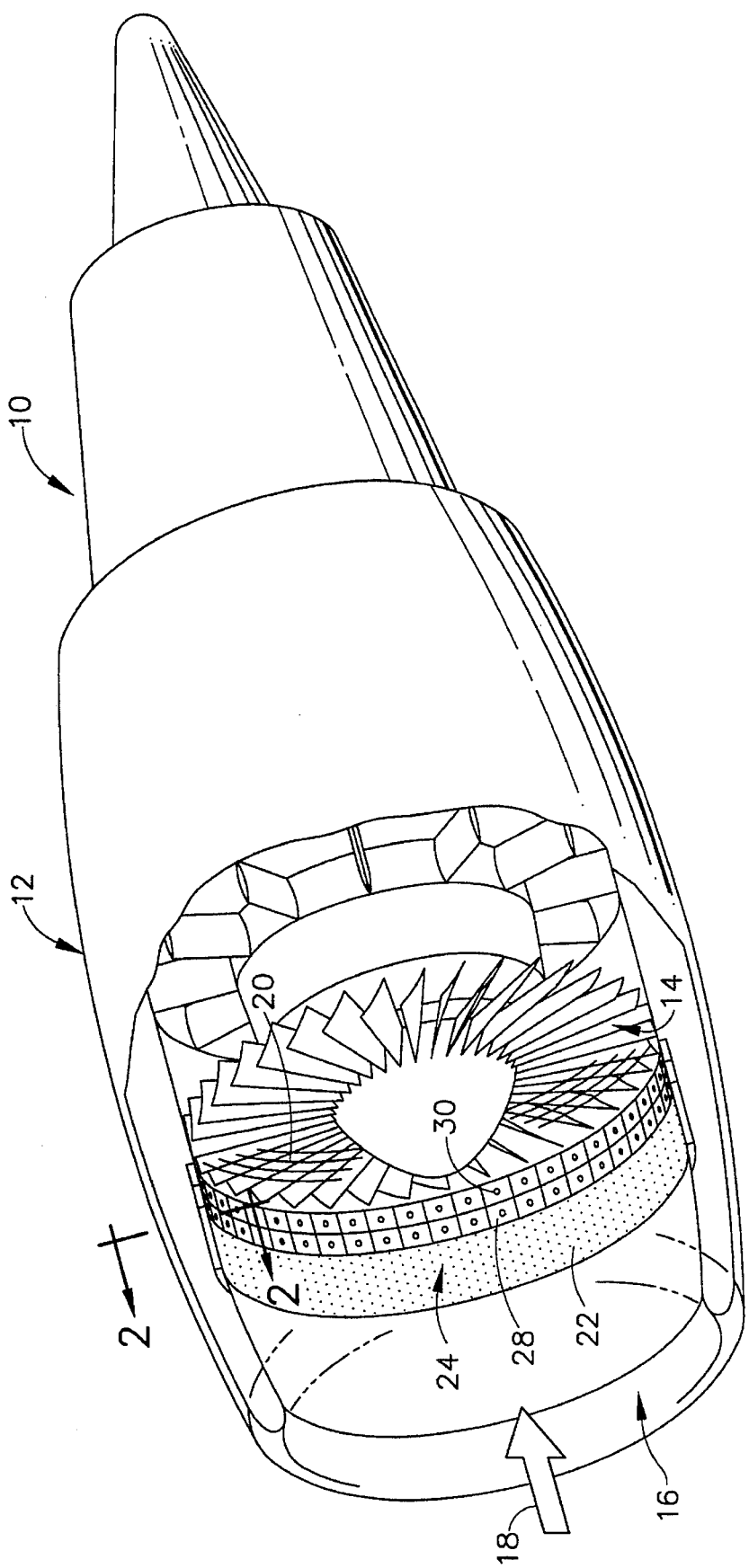
FIG. 1 is a perspective view of an exemplary turbofan aircraft gas turbine engine having a nacelle including an active acoustic liner therein disposed upstream of a fan for attenuating noise therefrom.

Illustrated in FIG. 1 is an exemplary turbofan gas turbine engine 10 configured for powering an aircraft (not shown) in flight. The engine 10 may conventionally be supported from the aircraft wing or tail as desired. The engine 10 includes a conventional nacelle 12 surrounding a conventional fan 14 which includes a plurality of circumferentially spaced apart fan blades which are powered by a power turbine (not shown) disposed downstream in the engine 10. The nacelle 12 includes an inlet duct 16 which receives ambient air 18 that flows downstream through the fan 14 along the axial centerline axis of the engine 10.

During operation of the fan 14, especially during takeoff of the aircraft when the blades of the fan 14 reach transonic and supersonic velocities, noise 20 is generated therefrom and propagates upstream and out the inlet duct 16. The noise 20 has various frequencies, and high frequency noise greater than about 1,000 Hertz is suitably attenuated or passively absorbed by an annular row of conventional high frequency acoustic panels 22 disposed at the upstream end of the inlet duct 16. Disposed upstream of the fan 14 and downstream of the high frequency panels 22 is an active acoustic liner or system 24 in accordance with one embodiment of the present invention. The active liner 24 is configured for attenuating relatively low frequency noise known as multiple pure tone (MPT) noise below about 1,000 Hz, and replaces a conventional passive acoustic liner for reducing the space requirements and weight while obtaining attenuation of the MPT noise up to the maximum amount available from the passive liners.

Figure 2:
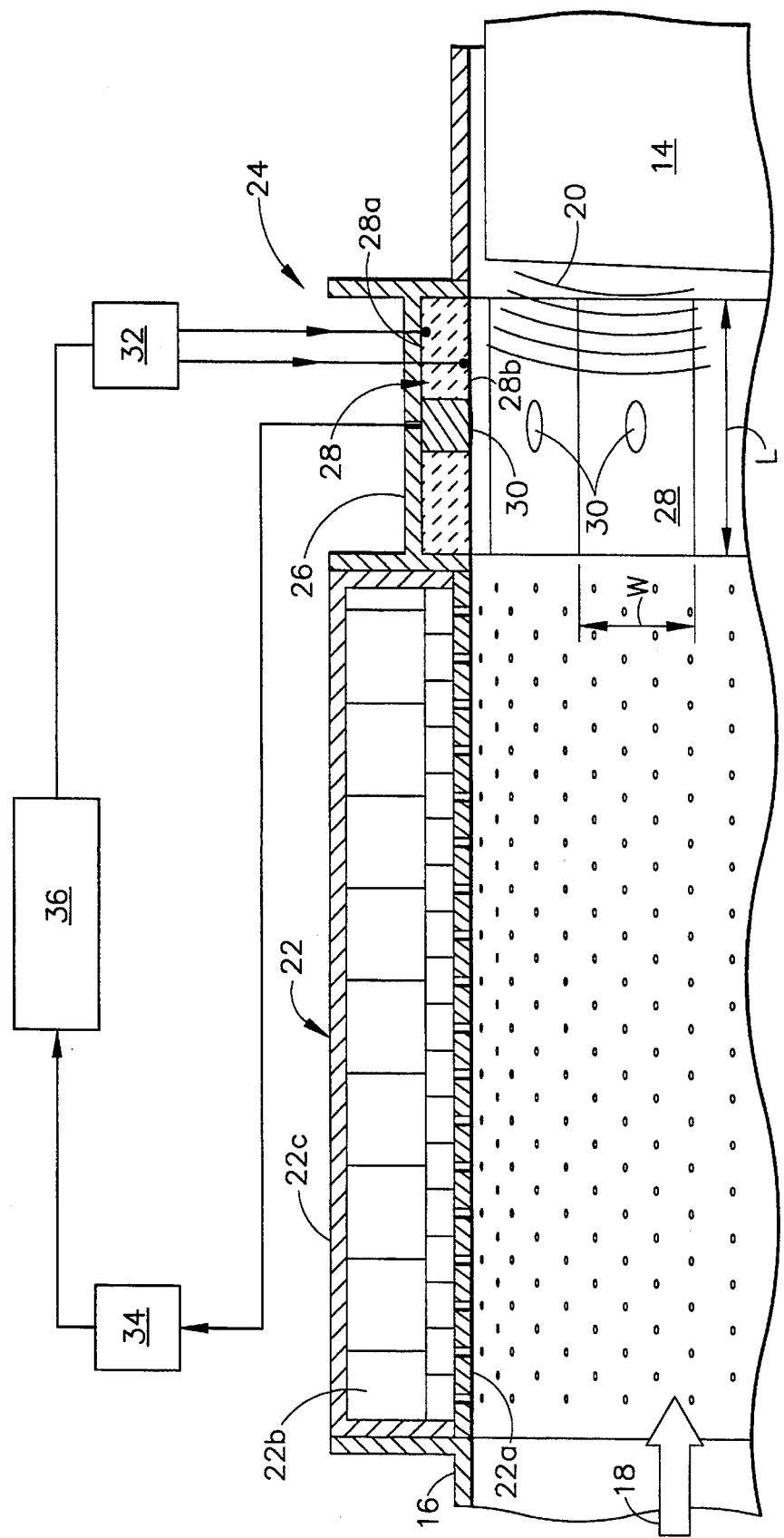
FIG. 2 is a schematic representation of the active acoustic liner illustrated in FIG. 1 and taken generally along line 2—2.

More specifically, FIG. 2 illustrates schematically a portion of the active liner 24 disposed between the fan 14 and the high frequency panels 22 within the inlet duct 16. The high frequency panels 22 have a suitable length and thickness for attenuating the high frequency component of the noise 20 and typically include a perforate facesheet 22a; one or more honeycomb layers 22b; and a rigid backplate 22c. But for the active liner 24 illustrated in FIG. 2, a conventional MPT acoustic liner would instead be located downstream of the high frequency panels 22 and would be substantially thicker than the high frequency panels 22 for attenuating the low frequency component of the noise 20. The active liner 24 in accordance with the present invention is relatively compact in comparison and is substantially thinner with reduced volume requirements therefore, and reduces overall weight of the engine 10.

The active liner 24 as shown in FIG. 2 includes a rigid backplate 26 which may be a suitable metal, or composite plate, or structural honeycomb panel. A piezoelectric panel 28 has a radially outwardly facing back surface 28a fixedly joined to the backplate 26 by a suitable adhesive bond for example. The piezoelectric panel 28 further includes an opposite, radially inwardly facing face surface 28b which directly faces the noise 20 to receive thereagainst acoustic pressure therefrom. A conventional pressure transducer 30 is fixedly disposed in the center of the panel 28 for sensing the acoustic pressure of the noise 20 being propagated against the panel face surface 28b. The piezoelectric face surface 28b faces radially inward in direct contact with the propagating noise 20, and along with the pressure transducer 30 disposed coextensively therein provides an imperforate, smooth surface over which the inlet air 18 may flow without disruption.

Means in the form of a conventional electrical displacement driver 32 are suitably electrically joined to the piezoelectric panel 28 for electrically driving the panel 28 with a suitable voltage to effect piezoelectric displacement thereof in a direction normal to the panel face surface 28b, which is radially inwardly in the embodiment illustrated in FIG. 2. The piezoelectric panel 28 may be formed of any suitable piezoelectric material such as Lead Zirconium Titanate (PZT) or Polyvinylidene Fluoride (PVDF), which upon application of a voltage thereto effects mechanical strain which thereby changes its thickness and correspondingly displaces the face surface 28b relative to the rigid backplate 26. By suitably driving or exciting the piezoelectric panel 28, the panel thickness may expand and contract to predeterminedly control the velocity thereof.

The pressure transducer 30 is operatively joined through suitable electrical wires to a conventional signal filter 34, and in turn to means in the form of a conventional electrical controller 36, which in turn is operatively joined to the displacement driver 32 for controlling displacement and velocity of the panel face surface 28b.

A conventional passive acoustic liner in the form of a perforated facesheet and honeycomb layers, such as in the high frequency panels 22, is specifically configured for effecting a predetermined acoustic impedance along the face or wall thereof for attenuating noise. The acoustic impedance is the ratio of the local acoustic pressure at the duct wall relative to the normal component of acoustic velocity of the noise 20 which accounts for phase and magnitude thereof. Using conventional analytical procedures, optimum values of acoustic impedance may be determined for passively attenuating noise at selected frequencies. A corresponding acoustic panel, generally similar to the high frequency panel 22 illustrated in FIG. 2, is then conventionally sized for effecting the required acoustic impedance for passively attenuating specific frequencies of the noise 20.

However, the active liner 24 illustrated in FIG. 2 may be readily configured or tuned for attenuating the noise 20 at any suitable frequency thereof by suitably controlling the displacement driver 32. The controller 36 preferably includes a predetermined schedule of acoustic impedance at corresponding frequencies for effecting a corresponding velocity of the panel displacement at the face surface 28b for a given acoustic pressure as sensed by the pressure transducer 30 for obtaining the predetermined acoustic impedance in the schedule to attenuate the noise 20 at the corresponding frequency.

For example, in one exemplary configuration of the engine 10 during takeoff operation thereof, a 5th order MPT at about 354 Hz is found in the noise 20. An optimum acoustic impedance at this frequency may be conventionally determined and then stored in the schedule within the controller 36. The filter 34 is conventionally configured for filtering the pressure signal from the transducer 30 to provide to the controller 36 magnitude and phase of the acoustic pressure at least at the predetermined frequency of 354 Hz as well as others if desired. Since acoustic impedance is the ratio of acoustic pressure to normal velocity, the controller 36 merely divides the filtered pressure signal received from the filter 34 for obtaining the required normal velocity, with a corresponding signal indicative thereof being sent to the displacement driver 32 which in turn applies a suitable voltage to the piezoelectric panel 28 to effect the required normal velocity at the panel face surface 28b. In this way, for the measured value of acoustic pressure at the face surface 28b of the panel 28, the panel 28 is actively caused to move at the corresponding velocity to effect the desired or optimum acoustic impedance thereat. Accordingly, the noise 20 may be attenuated or absorbed at the active panel 28 due to the corresponding acoustic impedance effected thereat. Since the active liner 24 operates for effecting the desired acoustic impedance at the face surface 28b, in this active mode of operation the liner 24 is limited in effectiveness to that of a corresponding passive acoustic liner specifically configured for obtaining the optimum acoustic impedance, if possible.

For suppression of the 5th order MPT at 354 Hz example introduced above, and using an arbitrary axial length L of the piezoelectric panel 28 of about 10 cm (4 inches), an optimum suppression of about 13.5 dB can be obtained for an acoustic impedance represented by its constituent components of acoustic resistance of 0.075 and acoustic reactance of −0.4, both normalized by a characteristic impedance of air at standard temperature (41.5 cgs Rayls). Conventional passive acoustic liners are limited to positive resistance and negative reactance, which may also be obtained by suitably driving the piezoelectric panel 28 actively. However, the low resistance value of 0.075 is too low to practically achieve using a conventional perforated plate at the analyzed Mach 0.48 duct flow condition. The corresponding reactance value of −0.4 would require a depth of a conventional passive acoustic liner of about 20 cm (8 inches) which is considerably large.

Accordingly, a suitable passive acoustic liner for achieving the optimum suppression of 13.5 dB is not practical, however, the required impedance may be obtained by suitably driving the piezoelectric panel 28. Continuing with the example introduced above, a typical sound pressure level (SPL) within the inlet duct 16 would be about 150 dB. The required displacement of the panel face surface 28b at 354 Hz would be about 2.5–5.0 mm (0.1–0.2 inches) peak-to-peak. A suitable thickness for the piezoelectric panel 28 is required for obtaining this amount of peak-to-peak displacement of the piezoelectric panel 28. Analysis has shown that the required displacement decreases rapidly as SPL decreases, but is fairly insensitive to impedance magnitude.

By incorporating into the controller 36 the predetermined schedule including the required acoustic impedance as a function of frequency, a suitable acoustic impedance may be effected at the panel face surface 28b at any desired predetermined frequency. And, the piezoelectric panel 28 may be driven at various frequencies simultaneously for effecting corresponding acoustic impedances for simultaneously attenuating various frequency components of the noise 20 as desired.

In the exemplary embodiment of the invention illustrated in FIGS. 1 and 2, a plurality of adjoining ones of the piezoelectric panels 28 are joined to a common backplate 26, or to corresponding individual backplates 26 if desired. Each of the panels 28 has a respective one of the pressure transducers 30 disposed therein, and a separate displacement driver 32 therefor, as represented schematically by the box labeled 32. The controller 36 correspondingly includes separate control channels operatively joined to the respective displacement drivers 32 for independently controlling the acoustic impedance at each of the panels 28. Also in this exemplary embodiment, the plurality of panels 28 are circumferentially adjoining and are disposed in a continuous ring for attenuating noise propagating therein. As shown in FIG. 2, one annular row of the panels 28 may be used, or two or more axially adjacent rows of the panels 28 may be used as shown in FIG. 1.

Also as shown in FIG. 2, each of the panels 28 in this exemplary embodiment has a generally rectangular configuration and is suitably arcuate for collectively forming the 360° ring. In order to effectively attenuate the noise 20, the size of each panel 28 is selected relative to the acoustic wavelength, with the axial length L and the circumferential width W preferably being a small fraction of the acoustic wavelength in those respective dimensions. For the 354 Hz MPT noise component example disclosed above, the acoustic wavelengths in the axial and circumferential directions are 97 cm (38.2 inches) and 37 cm (14.4 inches), respectively. In one exemplary embodiment, the dimensions of the panel 28 are selected to be one quarter of a wavelength, which results in a maximum dimension of 9.1 cm (3.6 inches) in the circumferential direction. Each panel 28 is preferably a square, and for the aircraft gas turbine engine 10 example introduced above, results in one row of about 63 panels 28 adjoining each other end to end. With an embodiment having one pressure transducer 30 for each of the panels 28, sixty-three (63) channels of control within the controller 36 would be required.

However, since the spatial properties of pressure modes are well known in the gas turbine engine art, it may be possible to reduce the number of pressure transducers 30 and corresponding channels within the controller 36. Fewer ones of the pressure transducers 30 than the number of panels 28 may be used by strategically placing the transducers 30 around the circumference of the inlet duct 16 based on predetermined spatial properties of the several pressure modes. Conventional interpolation techniques may be used within the controller 36 to predict the required acoustic impedance at panels 28 not having pressure transducers 30 based on the pressures sensed at the remaining panels 28. In this way the velocity phase of each of the panels 28 may be directly determined at each pressure transducer 30 location and interpolated for panels 28 disposed circumferentially therebetween.

As shown in FIG. 2, the backplate 26 and the piezoelectric panel 28 collectively have a relatively thin profile compared to the conventional passive acoustic liner which they replace, and will be typically thinner than the high frequency panels 22 themselves. This decreases the volume requirement and the corresponding weight of the active liner 24 immediately around the inlet duct 16. The required filters 34, drivers 32, and controller 36 may be remotely located as desired, with the additional weight thereof nevertheless providing an active liner assembly 24 which is lighter than the passive acoustic liner which it replaces.

Although the acoustic impedance effected by the active liner 24 in the preferred embodiment includes positive resistance for absorbing energy, there may be advantage in configuring the active liner 24 for effecting an acoustic impedance with a negative resistance for injecting energy into the system if desired.

Modal analysis of the optimum impedance case indicates that of the total 13.5 dB suppression, about 8.2 is due to a reflection effect and about 5.3 dB is due to absorption. Since the liner 24 is an active component without apparent passive damping, it is theorized that energy absorption will occur in the electronic displacement driver 32 as a result of the interaction of the motion of the piezoelectric face surface 28b end the pressure field, with the displacement driver 32 having suitable heat dissipation structures therein.

Accordingly, the active liner system 24 disclosed above adaptively provides a wall impedance in response to the sensed pressure field at each frequency for which suppression is desired. The piezoelectric panel 28 and corresponding backplate 26 are relatively thin thus obviating the need for treatment several inches deep to suppress the low frequencies. This should be a distinct weight advantage compared to conventional acoustic treatments, even including the weight of the required electronic components. The piezoelectric panel 28 may be tuned to multiple frequencies for simultaneously suppressing several orders of the MPTs. The panel face surface 28b is substantially smoother than a perforated plate which causes less flow loss and a thinner boundary layer carried to the fan 14, which may lower fan noise. The power requirement for the active liner 24 should be substantially lower than the power requirements for conventional active noise cancellation, or anti-noise, systems. Since the active liner 24 is limited in performance to the optimum attenuation available from passive acoustic liners, the axial length of the piezoelectric panels 28 will typically be the same as those conventional liners, and therefore duct length is not reduced. And in practical configurations, the active liner 24 is limited to attenuation of low frequency noise, since higher frequency noise would require smaller and therefore more piezoelectric panels 28 and corresponding control panels which decreases the practicality thereof. However, smaller sized panels 28 are envisioned down to the order of about 12 mm dimensions embedded in a solid state matrix sheet with integrated electrical connections and leads, as well as including integrated pressure transducers therein. A suitable multiple channel controller would be used therewith.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. An active liner for attenuating noise comprising:

a rigid backplate;

a piezoelectric panel having a back surface fixedly joined to said backplate, and an opposite face surface for directly facing said noise;

a pressure transducer disposed in said panel for sensing acoustic pressure of said noise being propagated against said panel face surface;

means for electrically driving said panel to effect piezoelectric displacement thereof in a direction normal to said panel face surface; and means operatively joined to said pressure transducer and said driving means for controlling displacement of said panel face surface, said controlling means including a predetermined schedule of acoustic impedance for controlling said driving means to effect a velocity of said panel face surface for said acoustic pressure for obtaining said predetermined acoustic impedance to attenuate said noise.

2. An active liner according to claim 1 further comprising a signal filter operatively joined between said pressure transducer and said controlling means for filtering a pressure signal from said pressure transducer to provide to said controlling means magnitude and phase of said acoustic pressure at a predetermined frequency; and wherein said predetermined schedule includes acoustic impedance as a function of frequency to effect at said panel face surface said acoustic impedance at said predetermined frequency.

3. An active liner according to claim 2 further comprising:

a plurality of adjoining ones of said piezoelectric panels joined to said backplate, each of said panels having a respective one of said pressure transducers disposed therein, and a separate driving means therefor; and said controlling means include separate channels for independently controlling said acoustic impedance at each of said panels.

4. An active liner according to claim 3 wherein said plurality of panels are circumferentially adjoining and disposed in a ring for attenuating noise propagating therein.

5. An active liner according to claim 4 wherein each of said panels has an axial length and a circumferential width, and each of said lengths and widths are smaller than respective acoustic wavelengths of said acoustic pressure at said predetermined frequency.

6. An active liner according to claim 5 in combination with a gas turbine engine having a fan and a nacelle, and said panel ring is disposed upstream of said fan within said nacelle for attenuating noise generated from said fan.

7. A combination according to claim 6 further comprising:

an annular row of high frequency acoustic panels disposed upstream of said panel ring configured for attenuating noise at frequencies higher than noise frequencies attenuated by said panel ring; and wherein said ring of panels is thinner than said high frequency panels.

8. A combination according to claim 7 wherein said acoustic impedance includes positive resistance and negative reactance.

9. A combination according to claim 7 wherein said acoustic impedance includes negative resistance.

10. An active liner according to claim 2 further comprising:

a plurality of adjoining ones of said piezoelectric panels joined to said backplate, with a corresponding number of said driving means joined respectively thereto;

fewer ones of said pressure transducers disposed in corresponding ones of said panels; and wherein said controlling means control velocity phase of each of said panels based on predetermined spatial properties of a pressure mode associated with said acoustic pressure at said predetermined frequency.

* * * * *